United States Patent [19]

Van Horn et al.

[11] Patent Number: 4,880,406

[45] Date of Patent: Nov. 14, 1989

[54] METER HANDLE MECHANISM

[75] Inventors: John W. Van Horn; Clyde Johnson, both of Harrison, Ark.

[73] Assignee: Duncan Industries Parking Control Systems Corp., Addison, Ill.

[21] Appl. No.: 199,449

[22] Filed: May 31, 1988

[51] Int. Cl.⁴ .............................................. F16D 7/04
[52] U.S. Cl. ..................................... 464/38; 194/227
[58] Field of Search ................... 194/227; 464/30, 38, 464/39

[56] References Cited

U.S. PATENT DOCUMENTS

| | | | |
|---|---|---|---|
| 2,716,875 | 9/1955 | Hill et al. | 464/38 |
| 2,744,396 | 5/1956 | Nagy et al. | 464/38 |
| 2,764,882 | 10/1956 | Bosworth | 464/39 |
| 2,797,564 | 7/1957 | Bonneau et al. | 464/38 |
| 2,901,899 | 9/1959 | Berky | 464/30 |
| 3,091,951 | 6/1963 | Onyskin | 464/30 |
| 3,738,467 | 6/1973 | Zajac et al. | 194/227 |
| 4,088,418 | 5/1978 | Dann | 464/38 X |

FOREIGN PATENT DOCUMENTS 710246  6/1954  United Kingdom .................. 464/39

Primary Examiner—Daniel P. Stodola
Attorney, Agent, or Firm—James P. Ryther

[57] ABSTRACT

A meter apparatus wherein time is purchased upon deposit of a coin or the like for setting of a clock mechanism. A parking meter may be involved, and a rotatable handle is provided for operating a drive shaft connected between the clock mechanism and handle. A clutch is interposed between the handle and drive shaft with the clutch including a pin or other releasable element engaging both the shaft and handle. A spring force is applied to the pin so that normal rotation of the handle will operate the drive shaft. Excessive force will release the pin in opposition to the spring so that damage will not occur even upon continued rotation of the handle. The pin and handle are ordinarily reset in a proper starting position so that the next operation of the meter will proceed in correct fashion.

3 Claims, 2 Drawing Sheets

FIG_5
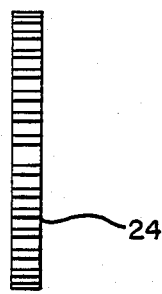
FIG_6
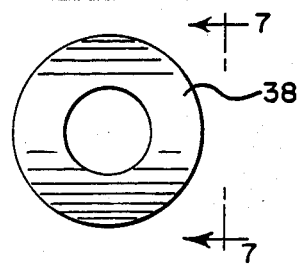
FIG_7
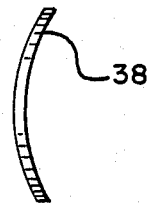
FIG_8
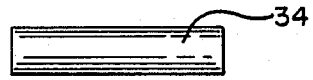
FIG_9
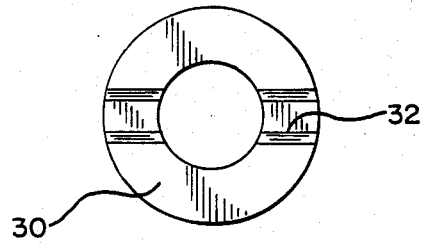

4,880,406

METER HANDLE MECHANISM

BACKGROUND OF THE INVENTION

This invention relates to parking meters or similar constructions which employ mechanisms designed for the purchase of time. In a typical meter, coins or other tokens are inserted, and an amount of time proportional to the value of the token is thereby purchased.

An example of a parking meter operating in the described fashion is found in Zajac, et al. U.S. Pat. No. 3,738,467 issued on June 12, 1973. This type of meter includes a handle and associated drive shaft connected to a clock mechanism. Insertion of tokens into the meter will result in temporary driving engagement of the clock mechanism whereby rotation of the handle and associated shaft will set the clock mechanism for a time period related to the value of the tokens inserted.

Meters of the type described are designed so that the coins or other tokens utilized are collected after the desired clock setting is achieved. This removes the driving engagement of the clock mechanism, and in normal operation, the person purchasing time will simply release the handle with the handle returning to a starting position. The clock mechanism will then wind down with the time purchased eventually expiring.

For various reasons, a user of a parking meter may apply excessive force to the handle whereby the handle will be rotated beyond the point desired for proper operation. For example, vandals might use a tool for purposes of driving the handle beyond a normal amount of rotation simply for purposes of damaging the property. With sufficient force, the pin or other means attaching the handle to a drive shaft may be sheared off or otherwise broken whereby the meter will become inoperative. Other examples may involve individuals who apply excessive force out of carelessness or with the mistaken impression that additional time might be achieved. Others may perceive that breaking of the handle drive mechanism would simplify theft of the meter contents, or that by damaging the meter, for example in the case of a parking meter, some free value might be obtained.

SUMMARY OF THE INVENTION

This invention relates to a meter apparatus having a drive handle and clock mechanism arrangement of a design such that application of excessive force to the handle will not render the meter inoperative. The invention particularly involves a meter apparatus wherein a rotatable handle is utilized for setting of a clock mechanism after deposit of an appropriate token in the meter. A drive shaft is connected between the clock mechanism and handle, and a clutch means is associated with the handle.

The clutch means includes a releasable pin or the like which engages the shaft and handle in the normal operation. Spring means are employed for applying force to the releasable means for achieving such normal engagement; however, application of excessive force will result in disengagement of the pin means in opposition to the spring means. Accordingly, handle rotation is made Possible without continued rotation of the drive shaft thereby avoiding damage to the clock mechanism or to other meter parts.

The arrangement of the invention also provides for accurate resetting of the pin means relative to the handle and driving shaft for purposes of achieving proper meter operation after the excessive force has been removed. Specifically, the pin means will be aligned relative to the handle before additional clock setting operations are initiated.

BRIEF DESCRIPTION OF THE DRAWINGS

FIG. 5 is a side view of a retainer plate utilized as part of the clutch mechanism;

FIG. 6 is a plan view of a spring washer utilized as part of the clutch mechanism;

FIG. 7 is a cross-sectional view of the spring washer;

FIG. 8 is an elevational view of a releasable pin utilized as part of the clutch mechanism; and, FIG. 9 is a plan view of a handle cap utilized as part of the clutch mechanism.

FIGS. 1 and 2 of the drawings illustrate a front plate 10 for a parking meter mechanism. As disclosed in the prior art, for example in the aforementioned Zajac, et al. patent, this plate defines slots 12 for insertion of coins or other tokens. A handle 14 is provided for rotation after insertion of the coins. Through the use of appropriate drive mechanisms, rotation of the handle will result in movement of indicator 16 for purposes of illustrating the amount of time purchased. A clock mechanism is wound by virtue of the handle rotation, and the indicator 16 will gradually return to a "zero-time" position as the clock mechanism unwinds.

As shown in FIG. 2, the handle 14 is mounted on a shaft 18, and this shaft is tied to a coin carrier including plate 20. As explained in detail in the aforementioned Zajac, et al. patent and in other patents referred to therein, the coin carrier, upon rotation of handle 14, operates to move the token or tokens being carried into contact with cam surfaces 15. Engagement of these surfaces by the coins results in engagement of clock winding means whereby continued rotation of the handle will wind the clock mechanism associated with the meter. When the coins reach the end of the cam surfaces, they are released from the coin carrier thereby discontinuing the clock winding. Continuing rotation of the handle will, therefore, have no further impact on the amount of time Purchased.

As explained, for various reasons individuals may nevertheless continue handle rotation whereby the meter could be damaged and rendered inoperative. FIGS. 3 through 9 illustrate a clutch mechanism which will avoid problems associated with such continued movement.

As shown in FIG. 4, the handle 14 is provided with bores of various diameters for containing the clutch mechanism. Specifically, the bore portion 22 is dimensioned to receive retainer plate 24. This retainer plate is provided with a knurled periphery and is adapted to be tightly fit within the bore portion 22. A swaging operation may be employed as illustrated at 26 in FIG. 3 for purposes of insuring that the plate 24 is held in a permanent position within the handle.

Figure 1:
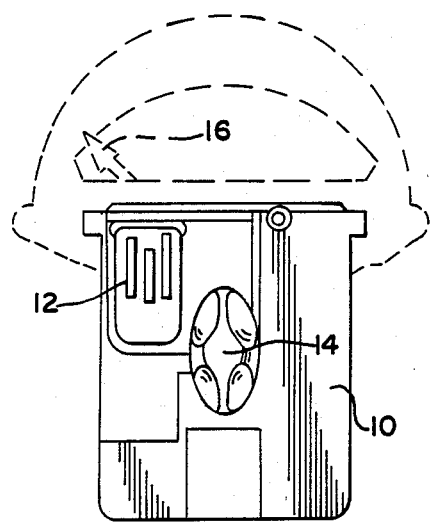
FIG. 1 is a front elevation of a portion of a parking meter housing.
Figure 3:
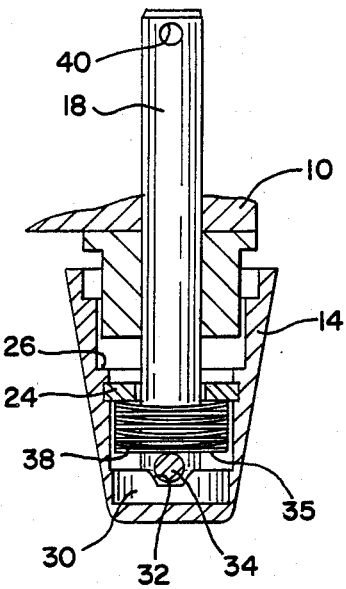
FIG. 3 is a cross-sectional view illustrating a handle interior and associated clutch means.
Figure 4:
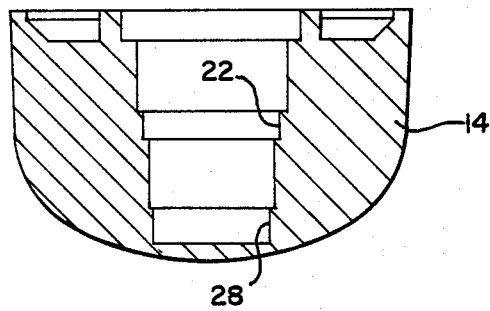
FIG. 4 is a cross-sectional view of a handle.
Figure 2:
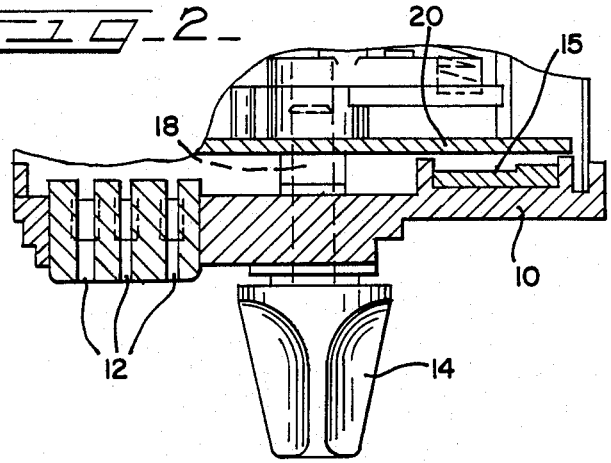
FIG. 2 is a fragmentary cross-sectional view of a parking meter housing portion illustrating handle and time setting features.

The smaller diameter bore portion 28 of handle 14 receives cap 30 shown in FIG. 9. This cap also defines a knurled outer periphery for tight fitting of the cap within the bore portion 28. Accordingly, the cap, like the plate 24, is maintained in fixed relationship with handle 14.

The cap defines a V-shaped groove 32 designed to receive pin 34. A flat washer 35 is positioned in engagement with pin 34, and a plurality of spring washers 38, separated by additional flat washers, are interposed between the pin and plate 24 for thereby normally retaining the pin 34 within the groove 32. As shown in FIGS. 6 and 7, the spring washers are of a circular configuration, and are curved to permit bending upon application of sufficient force.

The pin 34 extends through an opening defined by shaft 18. An additional opening 40 is defined at the opposite end of the shaft for tying the shaft to timer mechanisms in conventional fashion. As will be appreciated, the handle design is such that a meter may be operated in conventional fashion through rotation of shaft 18. Thus, the pin 34 engages the shaft through the opening provided while engaging the handle due to seating in groove 32.

Upon application of excessive force to a meter, the handle design described will result in rotation of the handle relative to shaft 18. Specifically, if the shaft 18 meets resistance, the continued application of force to the handle will tend to drive the pin 34 out of groove 32. If that force is sufficiently high, the pressure applied by springs 38 will be overcome and the pin 34 will then be caused to ride out of groove 32 on to the exposed surface of cap 30.

The handle 14, when rotated through 180 degrees, will move to a position such that the groove 32 will again be aligned with pin 34. At this point, the pin will snap back into groove 32, and if the driving force is removed, the meter will be set for further normal operation. If the driving force remains applied or is reapplied, the pin 34 will continue to ride out of groove 32, and the handle may therefore be rotated for many revolutions without damage to the clock mechanism or to other portions of the meter.

If the driving force were removed before the pin 34 returns to the groove 32, operation of the meter in normal fashion will still result in resetting of the handle into proper alignment with the drive shaft 18. Thus, the springs 38 are selected so that they will not apply sufficient force for driving of the clock mechanism without first moving pin 34 into groove 32. In any event, in a meter of the type described in the aforementioned Zajac, et al. patent, the degree of clock winding is dependent upon the length of the cam tracks 15 provided for tokens inserted, and would not be dependent on the location of pin 34 in groove 32.

It will be understood that various changes and modifications may be made in the above-described structures without departing from the spirit of this invention, particularly as described in the following claims.

That which is claimed is:

1. A parking meter apparatus wherein time is purchased upon deposit of a token for achieving setting of a clock mechanism, a rotatable handle defining a hollow interior, a drive shaft connected between the clock mechanism and handle, and a clutch means positioned within said hollow interior for permitting selective driving of said shaft by said handle, said clutch means including releasable means engaging both said shaft and said handle, said releasable means comprising a pin, and a groove formed in said hollow interior for receiving said pin, a cap positioned within said handle, said cap defining a central opening for receiving said shaft, and said cap defining said groove for receiving said pin, said pin being connected to said drive shaft for rotation therewith, and spring means positioned within said hollow interior applying force to said pin, said spring means engaging said pin for pressing said pin into said groove, and said spring means comprising a stack of washers positioned around said shaft with at least one of said washers comprising a curved spring washer, application of excessive turning force to said handle resulting in disengagement of said pin from said groove permitting rotation of said handle relative to said shaft in opposition to the force applied by said spring means, said pin being relocated within said groove after removal of said excessive force and prior to further setting of said clock mechanism.

2. A apparatus in accordance with claim 1 including a retainer plate fixed in position within said hollow register, said drive shaft extending through said retainer plate, said spring means engaging said retainer plate whereby said retainer plate operates to hold said spring means in engagement with said pin.

3. A parking meter apparatus wherein time is purchased upon deposit of a token for achieving setting of a clock mechanism, a rotatable handle defining a hollow interior, a drive shaft connected between the clock mechanism and handle, and a clutch means positioned within said hollow interior for permitting selective driving of said shaft by said handle, said clutch means including releasable means engaging both said shaft and said handle, said releasable means comprising a pin, and a groove formed in said hollow interior for receiving said pin, said pin being connected to said drive shaft for rotation therewith, and spring means positioned within said hollow interior applying force to said pin, said spring means engaging said pin for pressing said pin into said groove, and said spring means comprising a stack of washers positioned around said shaft with at least one of said washers comprising a curved spring washer, application of excessive turning force to said handle resulting in disengagement of said pin from said groove permitting rotation of said handle relative of said shaft in opposition to the force applied by said spring means, said pin being relocated within said groove after removal of said excessive force and prior to further setting of said clock mechanism, and including a retainer plate fixed in position within said hollow interior, said drive shaft extending through said retainer plate, said spring means engaging said retainer plate whereby said retainer plate operates to hold said spring means in engagement with said pin, and a cap fixed in position within said hollow interior opposite said retainer plate and in spaced relationship relative thereto, said cap defining said groove normally receiving said pin, application of said excessive turning force causing said pin to ride out of said groove for permitting rotation of said handle relative to said drive shaft.

* * * * *